US010193788B2

(12) United States Patent
Davis et al.

(10) Patent No.: US 10,193,788 B2
(45) Date of Patent: Jan. 29, 2019

(54) SYSTEMS AND METHODS IMPLEMENTING AN AUTONOMOUS NETWORK ARCHITECTURE AND PROTOCOL

(71) Applicant: Disrupter LLC, Walnut, CA (US)

(72) Inventors: Terence Davis, Santa Monica, CA (US); Andrew Milburn, Los Angeles, CA (US); Chris Paul, Anaheim, CA (US)

( * ) Notice: Subject to any disclaimer, the term of this patent is extended or adjusted under 35 U.S.C. 154(b) by 188 days.

(21) Appl. No.: 14/973,870

(22) Filed: Dec. 18, 2015

(65) Prior Publication Data

US 2016/0182350 A1 Jun. 23, 2016

Related U.S. Application Data

(60) Provisional application No. 62/094,941, filed on Dec. 19, 2014.

(51) Int. Cl.
| | | |
|---|---|---|
| *H04L 12/803* | (2013.01) | |
| *H04L 12/751* | (2013.01) | |
| *H04L 12/24* | (2006.01) | |
| *H04L 12/741* | (2013.01) | |
| *H04L 29/06* | (2006.01) | |

(52) U.S. Cl.
CPC .............. *H04L 45/02* (2013.01); *H04L 41/12* (2013.01); *H04L 63/0823* (2013.01)

(58) Field of Classification Search
None
See application file for complete search history.

(56) References Cited

U.S. PATENT DOCUMENTS

| | | | | |
|---|---|---|---|---|
| 5,881,242 | A * | 3/1999 | Ku ................... | H04L 45/00 709/238 |
| 7,194,002 | B2 * | 3/2007 | Zhang .............. | H04L 12/185 370/338 |
| 8,750,168 | B2 * | 6/2014 | Ramakrishnan .... | H04L 12/1886 370/256 |
| 2003/0026268 | A1 * | 2/2003 | Navas .............. | H04L 29/12009 370/400 |
| 2005/0283526 | A1 * | 12/2005 | O'Neal ............ | H04L 12/1854 709/223 |
| 2008/0170538 | A1 * | 7/2008 | Duggi .............. | H04L 12/185 370/328 |

(Continued)

OTHER PUBLICATIONS

An Autonomous Addressing Mechanism as Support for Auto-Configuration in Dynamic Networks. Schmidt et al. IEEE(2009).*

(Continued)

*Primary Examiner* — Venkat Perungavoor
(74) *Attorney, Agent, or Firm* — Fox Rothschild LLP; Christopher L.E. Hines

(57) ABSTRACT

A network having a nodal architecture consisting of a child/parent familial structure formed by a parenting process which creates a structure relative to each node, with descendants below, siblings beside, and a parent above. In this network, a one-to-many relationship exists from the perspective of an entity that is an ancestor to multiple descendants. Thus, a parent may have many children, who each may have multiple children themselves, but each node will only have one parent. Data packets are routed to destination nodes by propagating from one node to the next via the tree structure.

19 Claims, 21 Drawing Sheets uNET Packet Routing Logic

(56) References Cited

U.S. PATENT DOCUMENTS

| | | | | |
|---|---|---|---|---|
| 2008/0205394 A1* | 8/2008 | Deshpande | H04L 12/1854 | 370/390 |
| 2008/0228940 A1* | 9/2008 | Thubert | H04L 29/12207 | 709/238 |
| 2008/0285520 A1* | 11/2008 | Forte | H04W 36/0011 | 370/331 |
| 2009/0052448 A1* | 2/2009 | Ramakrishnan | H04L 12/1886 | 370/390 |
| 2010/0097971 A1* | 4/2010 | Kang | H04L 12/185 | 370/312 |
| 2011/0274107 A1* | 11/2011 | Lessard | H04L 45/16 | 370/390 |
| 2012/0030150 A1* | 2/2012 | McAuley | H04L 45/02 | 706/12 |
| 2013/0208620 A1* | 8/2013 | Kaufman | H04L 12/185 | 370/254 |
| 2013/0346504 A1* | 12/2013 | Huang | H04L 12/185 | 709/204 |
| 2014/0369251 A1* | 12/2014 | Zhang | H04W 4/08 | 370/312 |
| 2014/0376366 A1* | 12/2014 | Li | H04L 45/16 | 370/230 |
| 2016/0218959 A1* | 7/2016 | Eun | H04L 45/04 | |

OTHER PUBLICATIONS

MDHT: A Hierarchical name Resolution Service for Information-centric Networks. D'Ambrosio et al. ACM(2011).*

Disseminating streaming data in a dynamic environment: an adaptive and cost-based approach. Zhou et al. The VLDB Journal. (Year: 2008).*

Disseminating streaming data in a dynamic environment: an adaptive and cost-based approach. Zhou et al. (Year: 2008).*

* cited by examiner

Anatomy of a uNET Domain Address

Human Readable: disrupter.com

Reverse Notation: Dcom.disrupter

UTF8 Domain Address: D.636F6D2E646973727570746572

Anatomy of a uNET Account Address

Human Readable: clyde@disrupter.com

Reverse Notation: Dcom.disrupter@clyde

UTF8 Account Address: D636F6D2E646973727570746572.636C796465

UTF8 Account Provider Domain: D.636F6D2E646973727570746572

Connected (child sending at least once per 30sec)
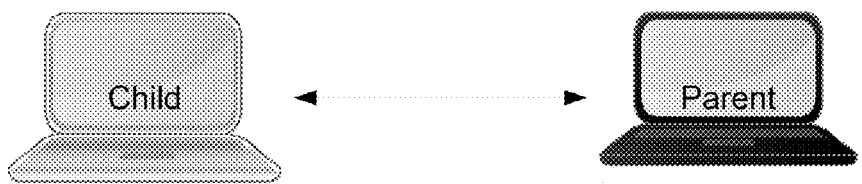
Connected Past Timeout (child has not sent within 30sec)
*Remedy:* Next packet requests XA-K
Disconnected (child failed to respond to a series of XA-K requests)
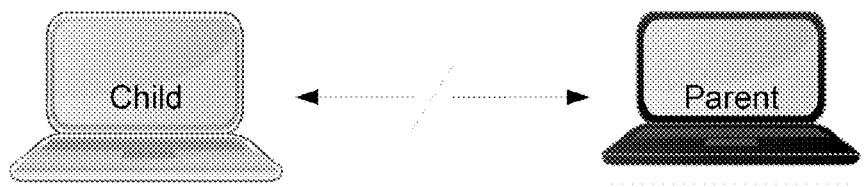
Fig. 8

SYSTEMS AND METHODS IMPLEMENTING AN AUTONOMOUS NETWORK ARCHITECTURE AND PROTOCOL

RELATED APPLICATIONS

This application claims the benefit of U.S. Provisional Application Ser. No. 62/094,941, filed Dec. 19, 2014, which is incorporated herein in its entirety.

FIELD OF THE INVENTION

Aspects of the present disclosure relate generally to networking, and more particularly, to an autonomous network architecture and protocol.

BACKGROUND OF THE INVENTION

The standard TCP/IP based network architecture that is commonly in use today and upon which the Internet is based has been known and used for over 50 years. As modern usage of the Internet has grown, a number of serious problems have arisen which are a direct result of the design of this networking system.

The inherently anonymous, unauthenticated nature of the TCP/IP approach, which provides an IP address to any device desiring to connect, leads directly to a large number of security problems on modern networks. "Spoofing", "Distributed Denial of Service" and "Man-in-the-Middle" are examples of security vulnerabilities that are well understood by experts in the field to be a constant concern requiring ever-more complicated countermeasures. The simple fact that entities can join a network without proving their identity and trustworthiness, while helpful in promoting the growth of the network, is a profound security weakness.

It is also the case that modern TCP/IP networks are difficult to configure and maintain, requiring great expertise and expense. User passwords, firewalls, subnets, router configurations and SSID all require expertise to properly administer even the smallest home network, and in larger corporate or government networks, the complexity rises exponentially.

It has also been found that high density networks using cellular data services or Wi-Fi, of the type that may be found for example, at an event venue where multiple thousands of people are trying to connect at once, suffer from severe connectivity and performance problems. In such environments, Wi-Fi facilities at the venue cannot handle the number of nodes attempting to connect, and local cell towers quickly become overwhelmed. Distributed networking, or "meshing" can allow traffic to flow among devices in a dynamic and distributed way, avoiding bottlenecks and making better use of available resources. Networks based on TCP/IP are not designed to handle large numbers of devices requiring large bandwidth. As such, distributed networks relying on TCP/IP do not perform as well needed to handle large numbers of devices simultaneously.

To achieve acceptable performance in high density environments using current technology requires a large capital outlay for hardware and network infrastructure. Additionally, the current networking scheme supporting the Internet has some inherent limitations brought about by the way networking has evolved over the last generation. The impetus, therefore, leading to the development of the present invention, was to find ways to improve or replace the current network architecture and protocols to make better use of existing bandwidth and existing infrastructure to improve performance in such environments. Subsequent to the development of solutions to these specific high-density problems, the present invention was expanded to address the security and complexity problems outlined above.

SUMMARY OF THE INVENTION

The present invention, an autonomous network architecture and protocol (herein referred to generally as the "autonomous communication system" or "ACS" or "uNET") provides a modern network protocol that is capable of leveraging existing global networking technology, processes and infrastructure. The autonomous network architecture and protocol improves upon over 50 years of traditional network infrastructure and fully utilizes existing hardware and protocols to deliver scalability, fault-tolerance and versatility, while being straightforward to implement.

Various aspects of the autonomous communications network described herein involve novel and unobvious concepts and new paradigms addressing four key aspects of ACS. These are: (1) Visibility; (2) Addressing; (3) Connecting; and (4) Routing. These concepts have been redefined from prior art networking protocols and take on new meanings in the context of the present invention and are discussed in detail herein.

The visibility features of ACS radically redefine the meanings of the concepts of "visible" and "connected". One aspect of the disclosed approach for ACS allows nodes to be aware of the collection of nodes around them without needing to actually needing to be connected to them, their network, or their sub-network.

The addressing features provided by ACS, such as use of address prefixes, provide a built-in mechanism to group addresses into virtual networks. Address prefixes in the ACS do not tie addresses for associated nodes to a particular network structure. Instead, addresses are tied to network nodes. A node may be, for example, a hardware device, a virtual node, for example, a virtual machine, an application running on a hardware device, a file system, an account, or any other conceivable entity that may be part of the network. Therefore, as used herein, the term "node" or "device" is meant to encompass all type of entities that may be attached to a network.

The permanent association to of an address to a node, and, in particular, to a hardware-based device, is a feature of the addressing component of ACS. The address space is expandable and seamlessly backwards compatible to accommodate future namespace sizing needs without rework of existing hardware, software or processes.

The basic architecture of ACS may be better understood through a description utilizing a child/parent/grandparent/great-grandparent/etc. familial structure (herein referred to generally as "parenting"). Parenting creates a structure relative to each node, with descendants below, siblings beside, and a parent above. In the disclosed approach, a one-to-many relationship exists from the perspective of an entity that is an "elder" to multiple descendants. Thus, a parent may have many children, who each may have multiple children themselves, but each entity will only have one parent.

ACS Trust System—ACS provides a built-in trust system. This is not an encryption system. To "establish trust" between any two nodes in an ACS network means that each device has been able to verify the identity of the other. The trust system is designed to provide each ACS entity with confidence that the identities of entities to which any entity is connected are valid. ACS provides guaranteed, trustable identification of all connected entities within an ACS network. This trust system prevents malicious transmission of data beyond the nodes within the immediate visibility horizon thus preventing intrusions and other forms of malicious behavior from propagating and causing destruction, alteration or theft of data.

ACS Account System—The ACS Account System is comprised of Account Providers and Account Members. The purpose of ACS accounts is to provide a system for a single entity to act as the governing entity over a collection of other entities. We suggest that human-usable ACS accounts have a UTF address derived from an email address or some other human-readable string for easy adoption by people. More generally, however, an account is any entity on the network that controls child entities that are assigned to it. This grouping is not part of the topology of the network connectivity and does not reflect ACS parenting. It is an arbitrary system of grouping. Its principle utility is to support a virtual entity, that has permissions assigned to it, so that devices controlled by this virtual entity can receive those same permissions by proxy. This account system, more than the prefixed naming system, should be used to give organizationally useful names to ACS entities.

An ACS Account Provider is a publicly addressable ACS node that provides ACS account services across the network.

The primary feature of the Account Provider is to hold the public routable address for one or more virtual nodes. A "Route For Destination Request" is sent to an Account Provider, which uses these messages to maintain a list of publicly-reachable entities (Account Members) and the physical route next-hops to reach them.

Account Providers may themselves be Account Members, which allows the creation of "nested" groupings of addressability.

It can be appreciated that, although the impetus for the development of ACS was high density environments, it is applicable in many other contexts. Various use-cases and parameters related to each specific scenario are provided in the following list. These scenarios may be implemented because there is trust at the network level, not at the node/entity level. However, those skilled in the art would understand that the list is not mean to be all inclusive:

- Military, including Battlefield Real Time data (tanks, aircraft, commanders, etc.), wherein each tank, aircraft, ship, battle station, etc., can be considered its own trusted network, which feeds up to a higher trusted network. Thus, if a trusted network is compromised, only a singular network is breached, not the greater network
- Commercial/Retail-Warehouse Management System, wherein ACS enabled RFID chips, broadcast data continuously as merchandise moves through supply chain tracking. This same hardware may then be (re)used for loss prevention in a retail environment.
- Private/Home based devices, including an ISP modem to provide upstream connectivity, webcams, smart meters, home printers, HVAC, and cell are all registered to a home network.
- Various application enhancements when utilizing ACS, including location awareness built into connectivity state, the ability to utilize same data stream to broadcast to unlimited destinations
- Personal Mobile Network, implemented using a small, externally-charged Class C Device, wherein the device has no screen on this device, just communications, battery, storage, and a computing capability for all things personal, including, for example, smart watches, which will no longer needs storage, wearable technology, including, for example, running sneakers, sweatband, pedometer, all of which communicate with the Class C device.
- Ubiquitous mesh networks and "Internet of Things" applications wherein any set of nearby devices can communicate over ACS to enter into ad-hoc networks, forming daisy-chained meshes which can span vast distances to provide continued connectivity at venues such as concerts, public spaces, ski-resorts, etc. The mesh network may also be used during earthquakes, power outages, or other abnormal or even catastrophic situations.
- The ACS-as-file system wherein, as more devices become ACS-aware, specific data being requested may exist closer to the requester than from the requested source, such that a fully ACS-aware network will be able to direct data to a target node without going back to an authoritative source.

DESCRIPTION OF THE DRAWINGS

FIG. 2(b) shows the encoding of existing domain names into ACS node addresses

FIG. 6 shows the uNET Frame types and Messages types in table form.

FIGS. 7(a)-7(i) show various packet structures for uNET packets.

FIG. 8 shows the possible "Connection States" of an ACS node.

DETAILED DESCRIPTION OF THE INVENTION

Figure 1A:
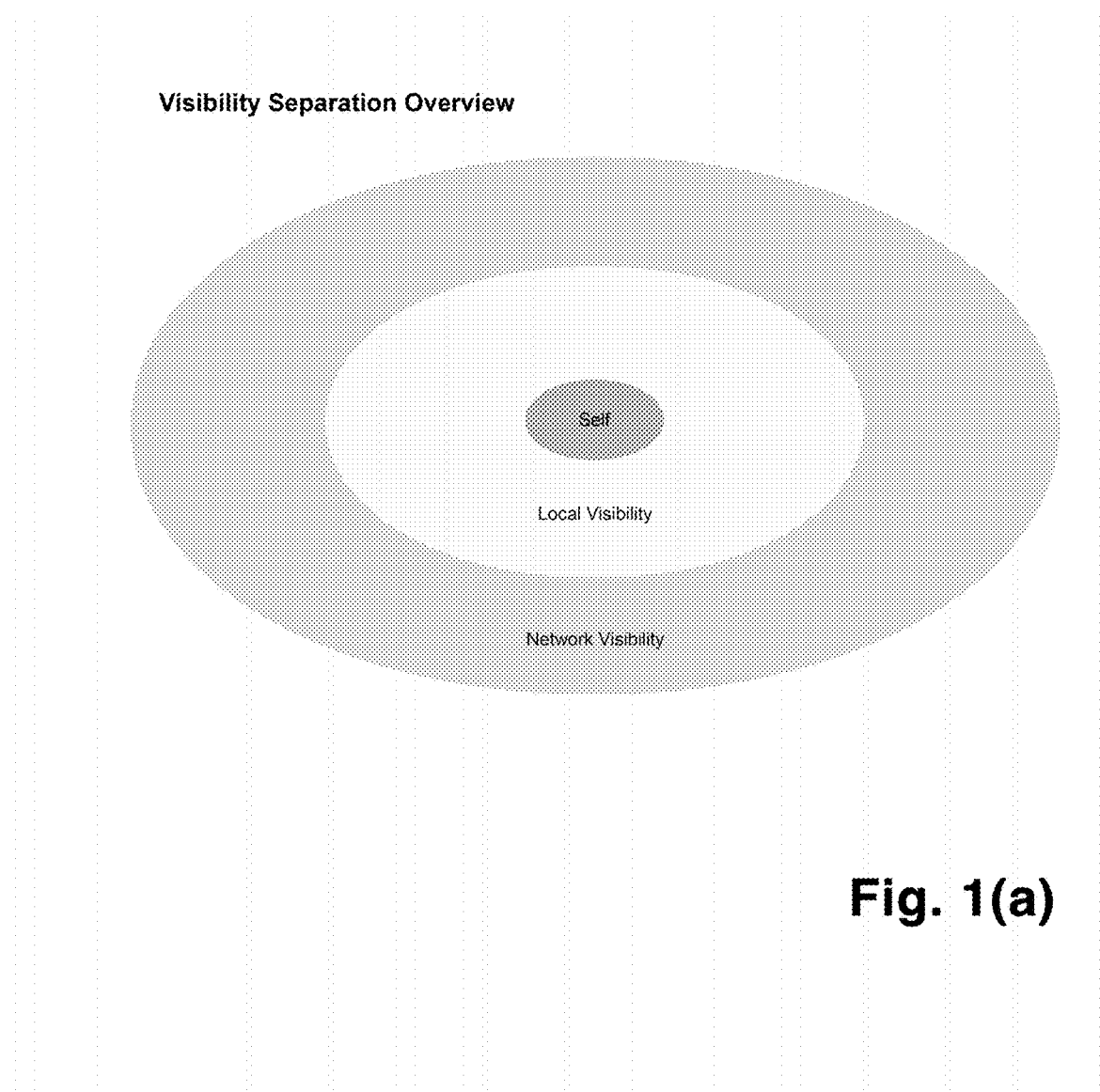
FIG. 1(a) shows the three possible visibility states of any ACS entity.
Figure 1B:
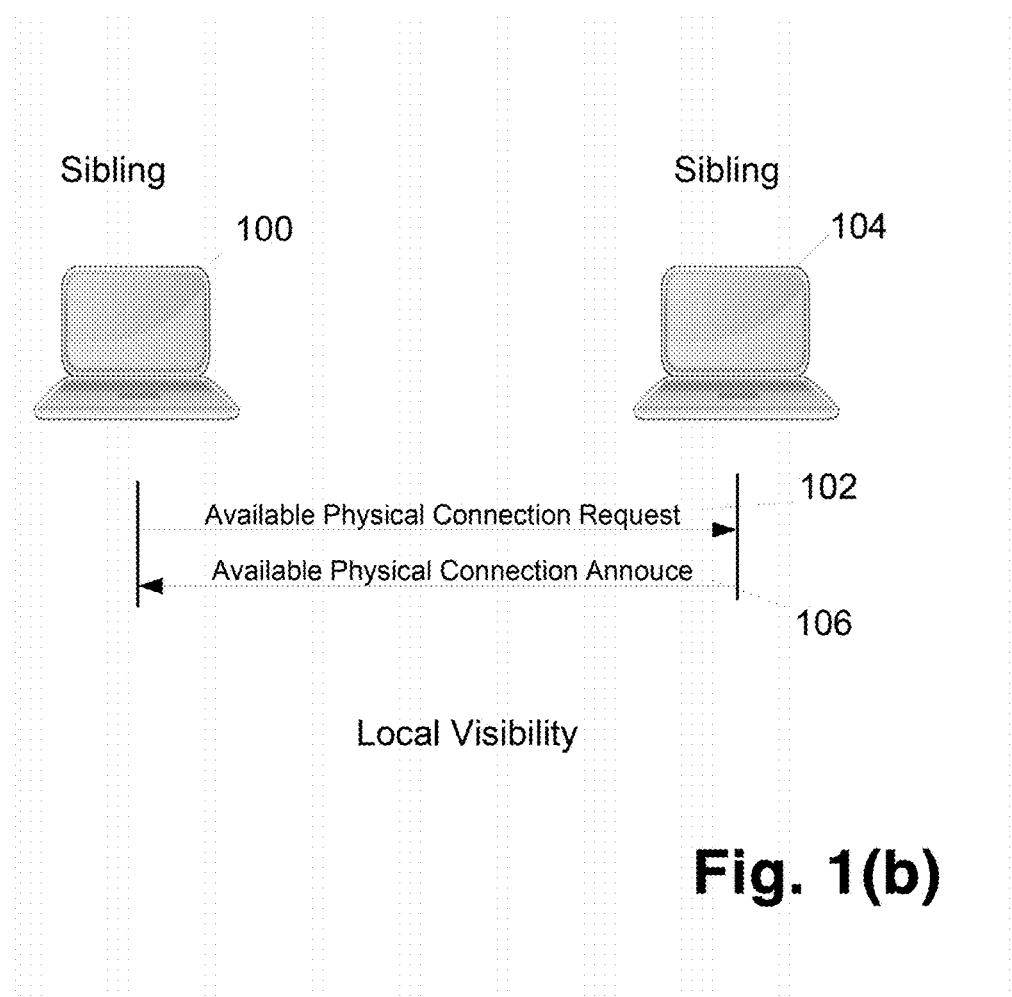
FIG. 1(b) shows the process whereby visibility of nodes with respect to each other is established

The detailed description set forth below, in connection with the appended drawings, is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Those of skill in the art would further appreciate that any of the various illustrative logical blocks, modules, processors, means, circuits, and algorithm steps described in connection with the aspects of the invention disclosed herein may be implemented as electronic hardware (e.g., a digital implementation, an analog implementation, or a combination of the two, which may be designed using source coding or some other technique), and various forms of program or design code. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, as purely software, or any other such configuration.

The term "hardware device" as used herein is meant to include any device capable of executing the required network interface, including (but not limited to), for example, mobile computing devices, smartphones, laptop computers, desktop computers, servers of any kind, including web servers, appliances, or any hardware device having means to communicate to other devices via, for example, a hard-wired connection, Wi-Fi, Bluetooth, NFC, or any other known protocol now existing or yet to be developed.

The functionality of modules execute on a processor described herein may be embodied directly in hardware, in a coded module executed by a processor, or in a combination of the two. A coded module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes (e.g., executable by at least one computer) relating to one or more of the aspects of the disclosure.

This description is provided to enable any person skilled in the art to practice the various aspects described herein. Various modifications to these aspects will be readily apparent to those skilled in the art, and the generic principles defined herein may be applied to other aspects.

The architecture of the network of the present invention is based on several concepts that distinguish it from currently existing network architectures, in particular, from that of a traditional IP-based network. These concepts will be summarized here and expanded upon in more detail below.

Visibility—ACS radically redefines the meaning of "visible" and "connected". Under ACS, visibility allows devices to "see" the collection of devices around them without needing to be connected to them, their network, or their sub-network (as allowed by users' privacy settings).

Parenting—In ACS, parenting creates a network structure relative to each node: nodes may have multiple descendants below, multiple siblings beside, and one parent above.

Visibility, Connecting and Parenting

Figure 10:
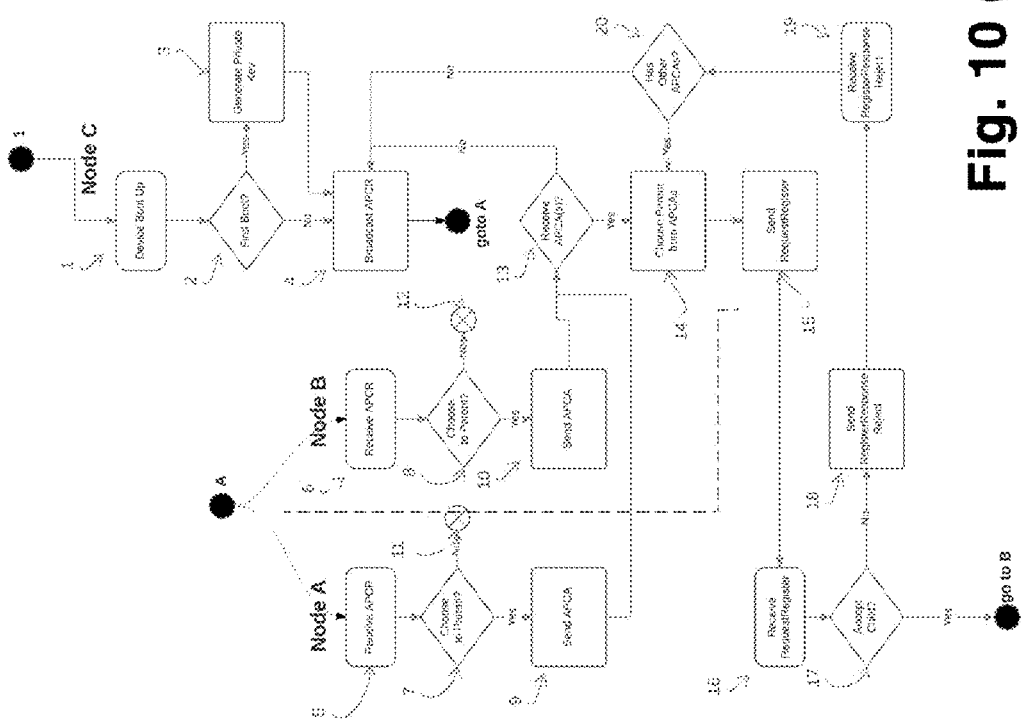
FIGS. 10(a) and 10(b) show the process of a node joining the network.
Figure 10:
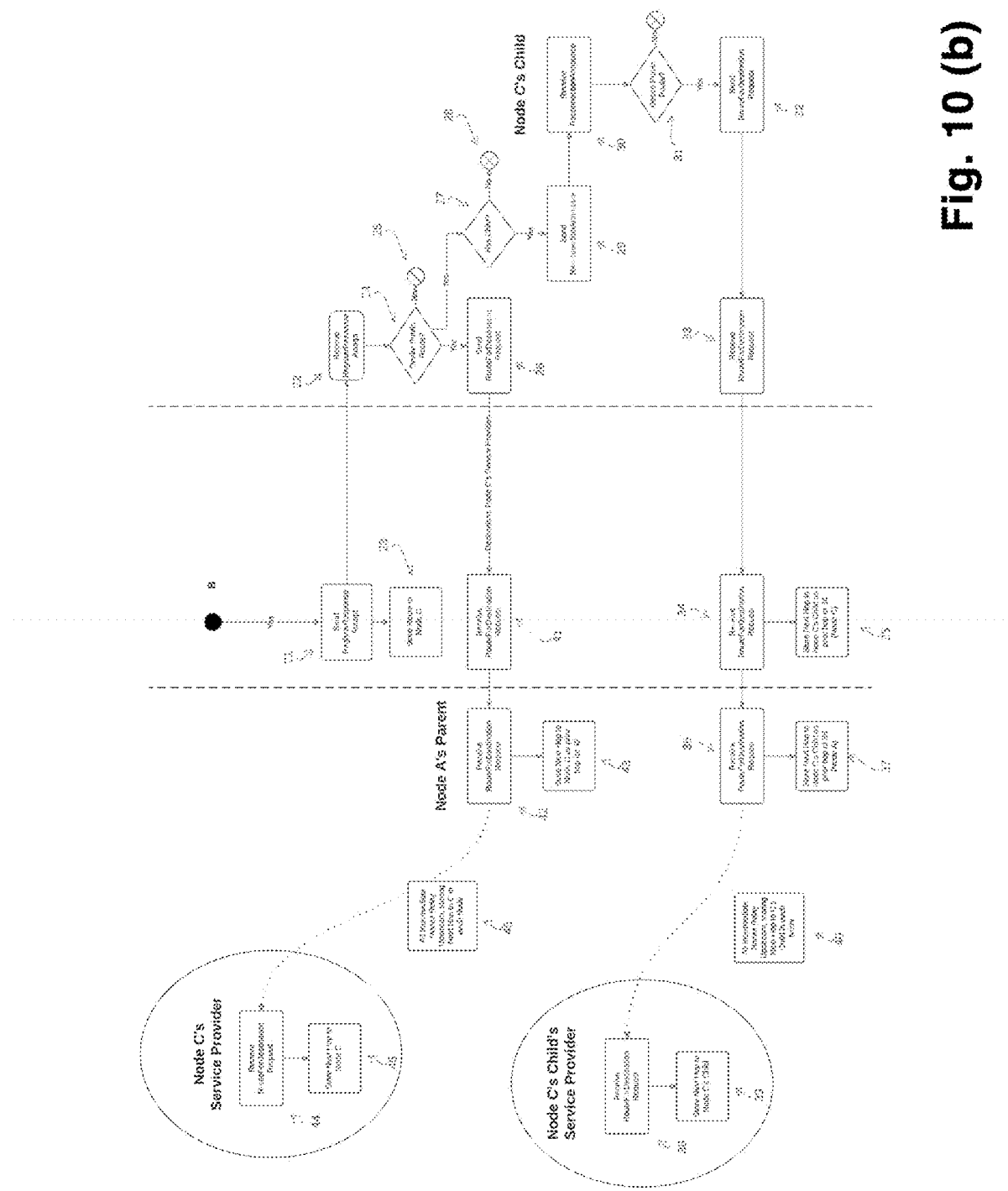

FIGS. 10(*a*) and 10(*b*) describe the flow when a new node is joining an existing network. At step 1, the node boots up and determines if it is it's first ever boot-up at 2. If so, then the node executes step 3 to create a new private key via an understood mechanism and proceeds to step 4. If the node determines that it has booted previously then it goes directly to step 4. At step 4 the device sends a broadcast "available physical connection request" ("APCR") message. The ACPR message consists of an ACS packet containing both its own ACS address and the unicast port it listens on to all interfaces. (In a specific implementation built on top of traditional network hardware, the UDP/IP protocol is used to "broadcast" these messages on the multicast network, preferably at 224.0.1.1:12345). The node then waits until responses to the APCR message are received. It should be noted that the term "physical connection" or "physically connected" refers to both the situation where two or more devices are connected with a physical, wired connected, and also to the situation where two or more devices are connected via a wireless connection.

All nodes within transmission range of node C, in this case node A and node B receive the APCR message at 6 and 7. In each case these nodes (A and B for example) determine if they are able to become parents to this node at 7 and 8 respectively. In this example, both nodes determine that they can become parents and reply with an "available physical connection announce" ("APCA") message at 9 and 10 to the sending node C. If any node determines that it will not become a parent of the sending node then it simply does not reply with an APCA message (11 and 12). The APCR message may contain meta-data which may be useful to node 104 in evaluating whether or not it can serve as a parent to selecting node 100. Likewise, the APCA sent back may also contain meta-data which may be useful to the selecting node in making the selection of which sibling node to select as its parent node. A prospective parent evaluates the request using any criteria available (for example, its own current load, the strength of its connection to the wider network, etc).

The original node C receives the APCA messages from each of the potential parents who replied. In the example, both nodes A and B replied at 13. The original node selects from one of the responding nodes at 14 and sends a RequestRegister message at 15 to the selected parent. All nodes 14 returning the APCA message that are not selected as the parent are categorized as siblings and stored. If no APCA messages are received at 13 then the node C can send a new APCR request out after some selectable or computed delay. It can continue sending out these APCR request until another device appears. It may also send out additional APCR requests, even after other devices have been discovered and/or connections made, in an ongoing effort to maintain a current list of "visible" nearby devices.

In the case where a device broadcasts an APCR and receives no reply, either because no visible devices are eligible parents or because there are no visible devices in range, the device continues to periodically broadcast APCRs, in the hope of initiating contact with newly-arriving devices.

Returning to the example, in the situation where one or more potential parents respond, the selected parent, in this case, node A, receives the RequestRegister message at 16. The selected parent then determines if it can still accept the new node as a child node at 17. If it cannot accept the child then it will send a RegisterRespondReject message to node C at 18. In this case, the node C will receive the RegisterRespondReject message at 19 and determine, at 20, if there are any other potential parents that responded with an APCA. If so, it will select one of the remaining potential parent nodes 14 and begin again. If no other potential parents are available then it will go back to 4 and issue APCR after some selectable or computed delay.

In the case of a parent accepting the RegisterRequest the parent node A will send a RegisterResponseAccept message at 21 to node C which will accept the RegisterResponseAccept message at 22. At the same time the parent node A will add the new node C to its routing table at 23.

Node C then determines if it wants a public route at 24. If not, then the nothing further occurs at 25. If so, then node C sends a RouteForDestinationRequest to its parent at 26. If node C does not have any child nodes at 27 then this flow stops. If it does have children, then for each child of node C a ReconnectionAnnounce message is sent to that child at 29. Each child of node C in turn receives the ReconnectionAnnounce message at 30. Each child in turn propagates this ReconnectionAnnounce message downstream to its own children. This propagation continues all the way to the ultimate leaf nodes below these children. These children similarly determine if they need a public route at 31 and if so issue their own RouteForDestinationRequest message at 32 to their parent. In this example, the parent is node C again which receives the RouteForDestinationRequest at 33. This RouteForDestinationRequest message is sent up to node C's parent (node A) which receives the RouteForDestinationRequest message at 34 which stores the next hop to C's child, i.e. node C, in node A's route table at 35. Node A also sends the RouteForDestinationRequest message to its parent (Node A's parent) which receives the RouteForDestinationRequestMessage at 36. Node A's parent saves the next hop to node C's child, i.e prior hop of the RouteForDestinationRequestMessage at 36 (aka Node A), in its route table at 37.

Node A's parent sends the RouteForDestinationRequest to node C's child's service provider which receives the RouteForDestinationRequest at 38, which saves an entry to node C's child in its route table at 39. Along the way to node C's child's service provider each node that receives the RouteForDestinationRequest and forwards it also saves an entry in its route table for node C's child at 40.

Back when node C determined to have a public route at 24 it sent its own RouteForDestinationRequest to its parent at 26 which is received by its parent, node A, at 41. Node A forwards the RouteForDestinationRequest message to its parent, which receives the RouteForDestinationRequest at 42. Node A's parent saves the next hop to node C in its route table at 43 and forwards the RouteForDestinationRequest to node C's service provider.

Node C's service provider receives the RouteForDestinationRequest at 44 and saves an entry for the next hop to node C in its route table at 45. Along the way to node C's service provider, each node that receives the RouteForDestinationRequest and forwards it also saves an entry in its route table for node C at 46.

Trust

For ACS networks that are implementing the trust system, the process of parenting is preceded by an exchange of messages designed to establish "trust" between both parties. The principal property of this trust is confidence that the unique ACS addresses of each party are valid—that each party "is who they say they are".

For each ACS device, the trust system must first be initialized by the acquisition of a "certificate authority bundle". For our purposes, a "certificate authority bundle" is a collection cross-signed certificate authority public certificates. An ACS device may have this bundle built in during manufacture, or manually installed through some other process, or downloaded. This needs to happen only once, at the beginning of the life cycle of an ACS device, but may also subsequently be updated with additional certificates to extend the web of trust expressed by the bundle over time.

Each ACS device upon initialization must generate a private key, to be stored in protected memory. Protected memory is a form of local physical storage which is protected against reading and duplication by any external actor. The security of this private key is critical. It is never transmitted, never used for encryption and never known to any party except the ACS device itself. The generation of this key is dependent on the device having a unique ACS name (an ACS address, with prefix and ID), built into the device at the time of manufacture, in much the same way that modern devices currently have MAC addresses embedded in them, which are issued by a governing body. It is incumbent on the manufacturer or designer of the device to insure that each device generates a unique ACS, conforming to ACS standards, and including whatever specific prefix information that manufacturer or designer has determined is relevant to the class or instance of the device.

This private key generation should happen only once, at the beginning of the life cycle of the device. This private key should never be transmitted, copied, or otherwise exposed. This private key, along with the device's unique ACS name, is used to generate a certificate signing request ("CSR") which is then sent to a certificate authority to be assigned a public key which may then be used in the establishment of trust with any other device whose public key has been signed by a certificate authority in the same bundle.

There may be more than one certificate authority bundle (e.g. one per segregated military network, corporate networks, etc) stored within an ACS node, each supporting trust establishment with a distinct group of ACS entities.

ACS establishes trust between any two nodes by using the certificate signed by this certificate authority bundle in a bidirectional key change, without the need to consult a third party. Both of the keys in the bidirectional exchange are assumed to have been signed by a certificate in the certificate authority bundle. This certificate authority bundle is assumed to be available at startup for any ACS device by definition (see initialization above). This concept of "pre-shared" certificate authority bundles as a mechanism for allow identity verification between any two parties without mediation by a third party is a novel feature of the ACS system.

After this trust has been established, ACS does not prescribe the type of additional protection/encryption that may or may not be used in transmission of data between nodes. ACS recommends against usage of any of the certificates signed by the certificate authority bundle for the encryption of actual transmitted data. ACS encourages the use of session-style encryption (like PGP) for point-to-point transmissions of data.

Figure 4:
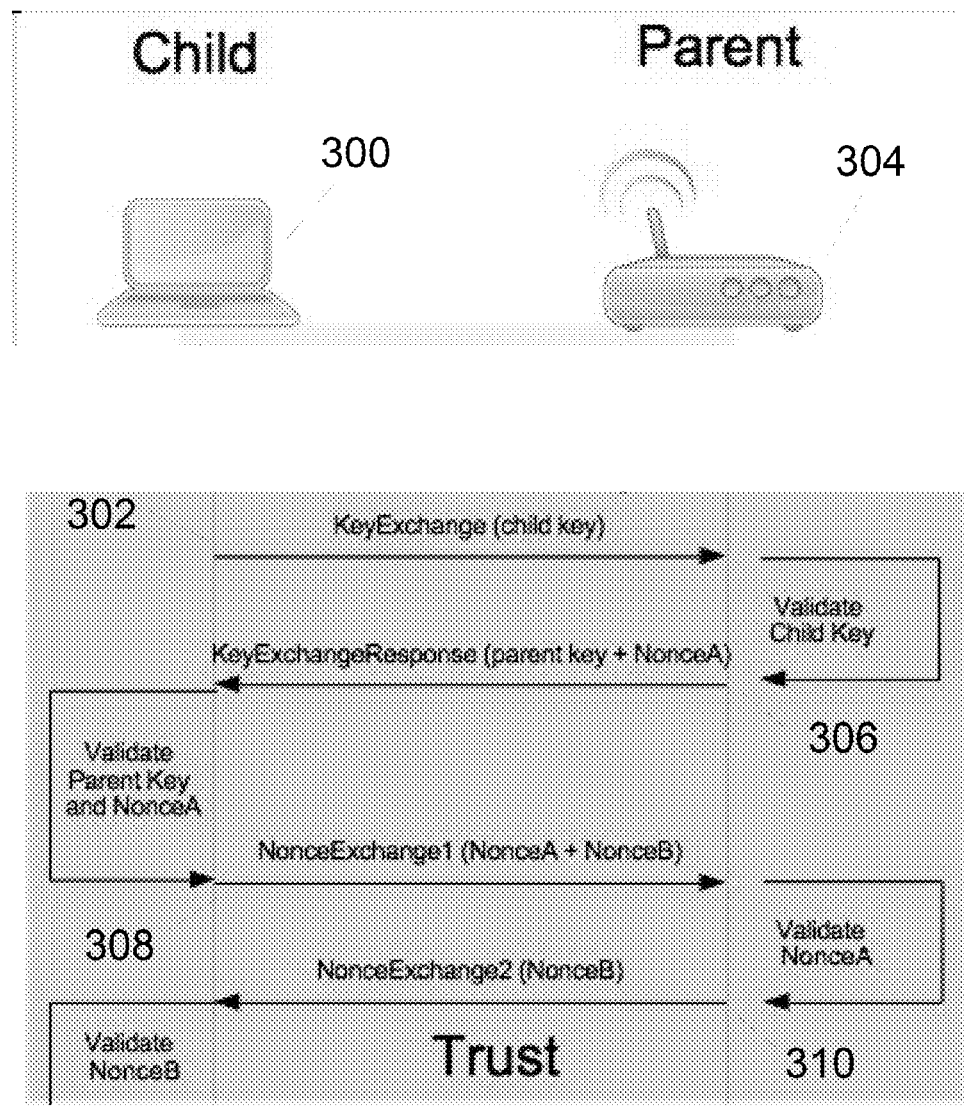
FIG. 4 shows the flow of messages in the Trust system.

FIG. 4 shows the process of establish trust through a series of message exchanges.

The prospective child 300 first sends a "Key Exchange" message 302 to the selected sibling (now the prospective parent) 304. This message contains the prospective child's 300 unencrypted signed public key. It is not necessary that "Key Exchange" be sent to any other siblings, but as an optimization additional siblings may selected to be "backup" parents in the case of some failure by the chosen parent, and these backup parents may also be sent "Key Exchange".

The prospective parent 304 first validates the signature of the key received from its prospective child 300 against its internal certificate authority bundle. If valid, it stores the key and replies to its prospective child node with a "Key Exchange Response" message which contains its public key encrypted with this newly-received key and a new nonce (nonceA) also encrypted with this key. The prospective parent 304 may on the other hand may at this point decline the request for a key exchange which will terminate the trust process and also any pending parenting process and the prospective child may return to the step of selecting a prospective parent from its other visible siblings.

The prospective child 300 decrypts the received key and the received nonce. It replies with a "Nonce Exchange1" message 308 that contains the decrypted received nonce, re-encrypted using the prospective parent's public key, and a new nonce, also encrypted with this key.

The prospective parent 304 decrypts the first nonce and checks that it matches the nonce it most recently sent in its last outbound "Key Exchange Response" message 306. It then responds with a final "Nonce Exchange2" message 310 that contains the second nonce, encrypted using its own public key.

The prospective child 300 now decrypts the nonce contained in this last "Nonce Exchange2" message 310, and confirms that it matches the nonce it most recently sent in its last outbound "Nonce Exchange1" message 308.

At this point the prospective parent and child nodes have established mutual trust. They can each be confident of the identity of the other.

The prospective child may now proceed with the parenting process as discussed above.

In a preferred embodiment, the private key used in this trust-establishment handshake is stored locally on the device, in a special form of protected memory which is resistant to duplication or reading by external actors. Since this private key is never shared in anyway, and keypairs based upon it are used only in the establishment of identity, not in the encryption of transmitted data, the risks of key exposure are greatly reduced.

Routing

ACS nodes are responsible for routing traffic (e.g., uNET Packets) to any destination node designated as the "Destination" in a point-to-point ("PTP") packet which it receives from any of its physically connected ACS nodes.

Figure 9:
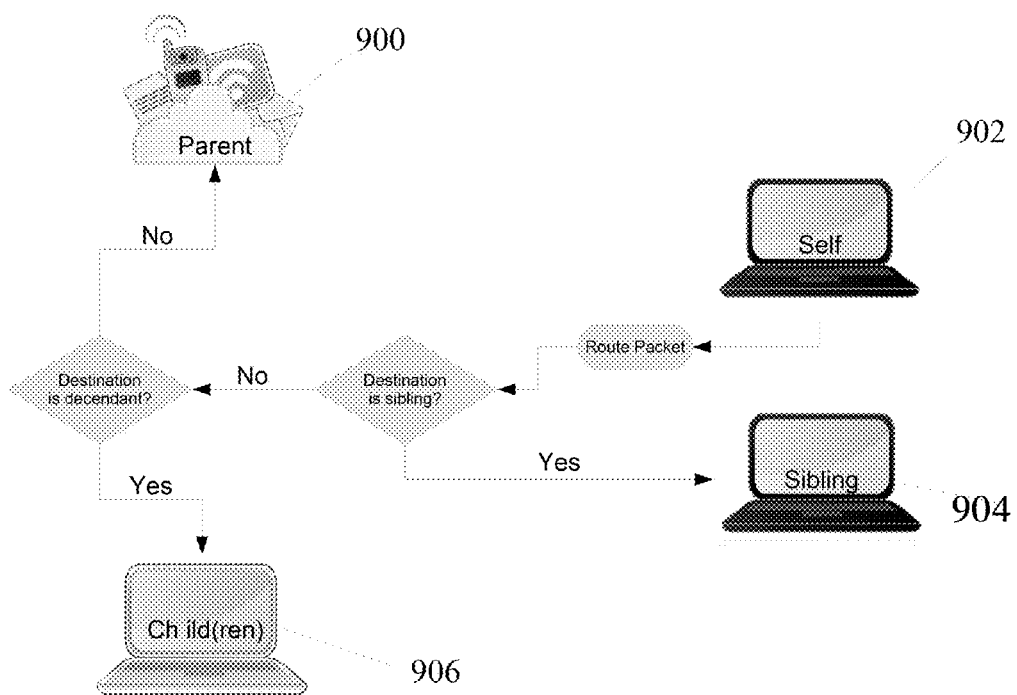
FIG. 9 shows the network packet routing logic in schematic form.

FIG. 9 illustrates the possible actions an ACS can take for any given incoming uNET packet.

The node 902 receives a packet. If that packet is addressed to itself, then obviously no routing is needed, and the packet is parsed and consumed by the application layer.

Otherwise, the node 902 first determines if the destination address of the packet is a sibling. If so, then it simply outputs that packet directly to the sibling 904 via its physical connection. This will complete the routing of this packet.

Otherwise, the node 902 determines if the destination address of the packet is a descendant of itself. In other words, if any of its downstream nodes (chidren, grandchildren, great grandchildren, etc) are the destination. This determination is made by consulting the local route table each ACS node maintains by monitoring RouteForDestintationRequest messages which are moving upstream through itself. This route table has a single entry for each originator of a RouteForDestintationRequest which has been relayed by the given node, with an association to the ACS sibling 904 which actually passed the RouteForDestintationRequest to it.

If the destination is determined to be a descendant, then the packet is passed to the physically connected node which is identified in the local route table as the "next hop" toward that descendant 906. Otherwise, the packet is passed on to the parent 900.

Nodes may connect anonymously to the network without being "trusted". Nodes willing to route for the anonymous network can allow downstream nodes to connect to upstream resources by storing the next hop of the return path for a given connection. This route should have a very low time-to-live (5-30 seconds) that is refreshed when traffic comes from either direction and is in addition to the standard States of Connection system. In other words, either a short lack of data from either side, or a complete lack of data from the original requester will result in route deletion. This does not mean that routing has been broken, only that the original requester must refresh the connection due to the loss of the return path. A node that has not heard from a connected node (i.e., a parent or child) for some pre-determined period of time (the "hybrid timeout") can set the connection status to "unknown" and include an explicit handshake request in the next communication to that node. If the node in question returns an ACK of the packet, the status of the connection is revised to "active". The explicit handshake can be generated on the next reason to communicate, independently when the connection state becomes unknown or for any other reason.

Routes to nodes that do not need to be publicly accessible (i.e. nodes issuing requests and expecting a response to some outside location) do not need a persistent route table entry. Routing nodes can expire entries for this type of node after the response to the initial request is received and/or after some timeout period has elapsed. In this way only nodes that are actively communicating or who need to be visible from the outside are kept in the routing table which keeps the table size to a minimum.

Figure 5:
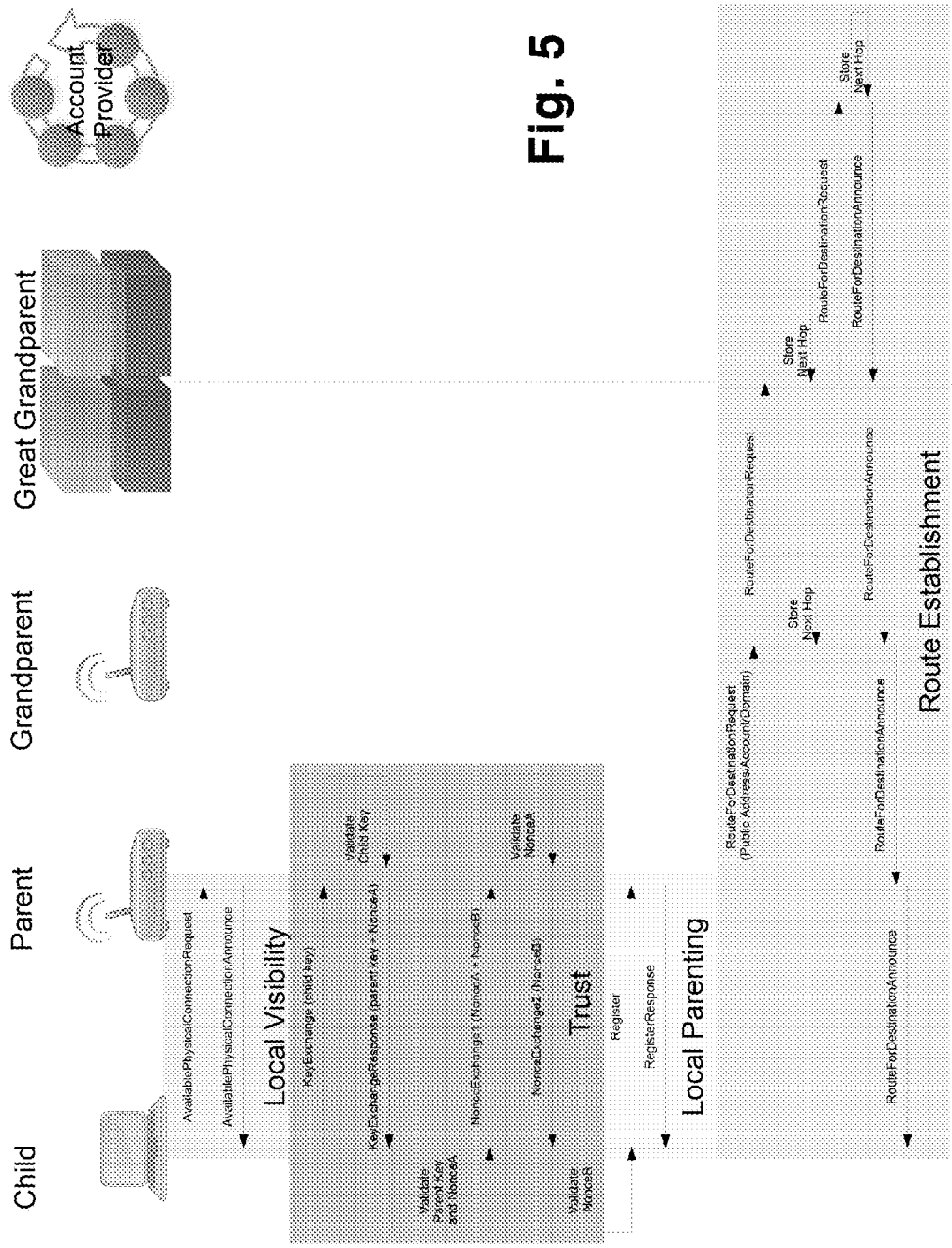
FIG. 5 shows the flow of various uNET messages.

There is no formal disconnection process required due to the loose definition of the States of Connection, as shown in FIG. 5. Disconnect Announcements may be aggregated.

Addresses and Addressing

Figure 2A:
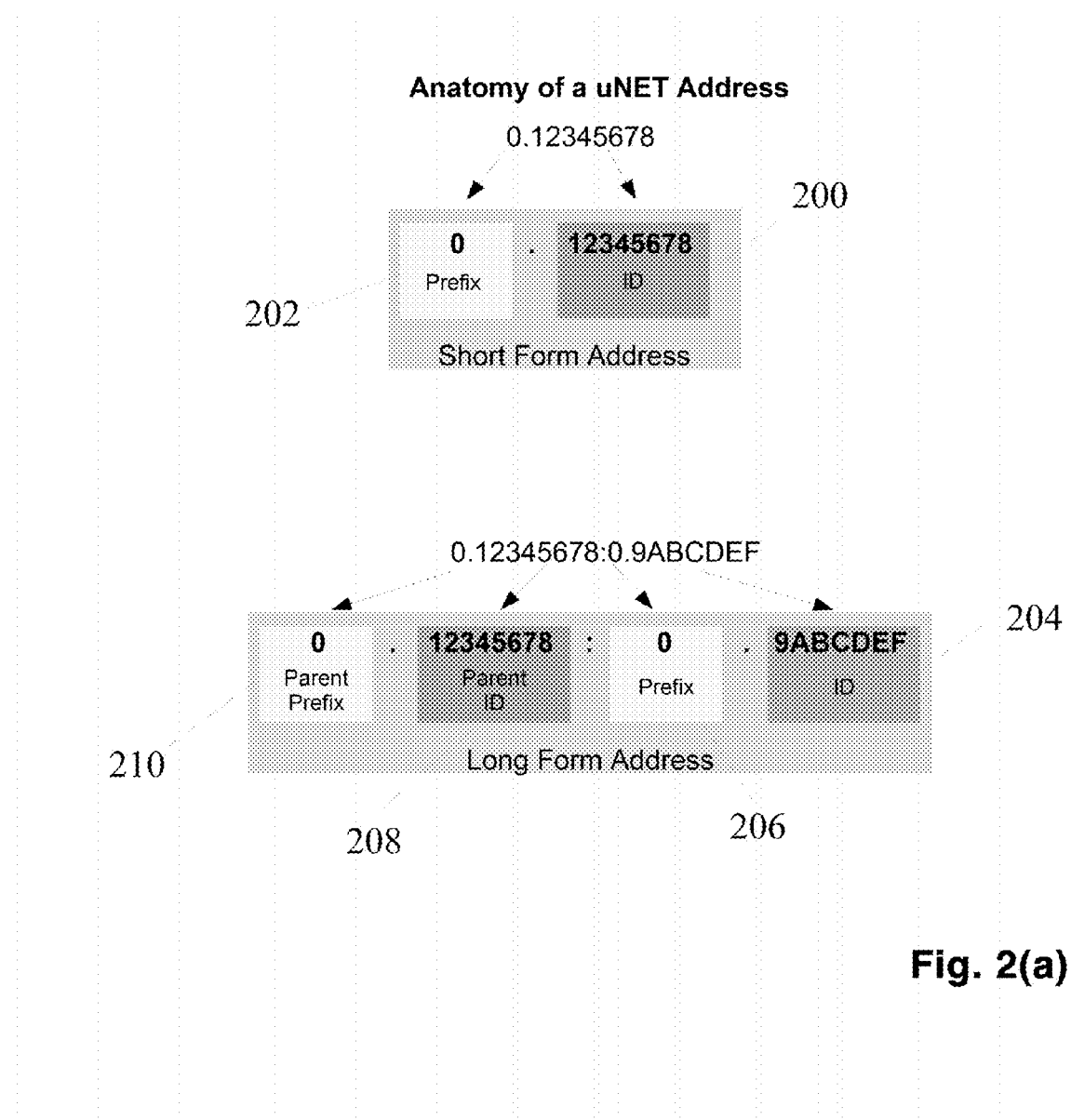
FIG. 2(a) shows the format of a short and long form ACS node addresses
Figure 3:
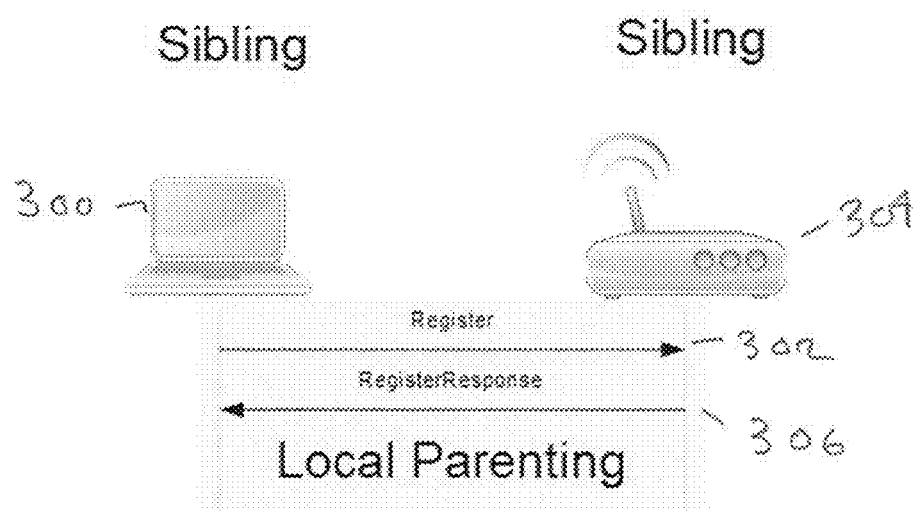
FIG. 3 shows the process whereby a parent node is selected.

FIG. 2a shows an example of a "Short Form" ACS Addresses which is defined as having a prefix and an ID. FIG. 2a also shows an example of a "Long Form" ACS address, which prepends the "Short Form" address of the node's "parent", if the node is connected to a parent. Each hardware-based node is assigned a permanent device ID 200 by the manufacturer of the device. Device ID 200 is preferably unique. For "nodes" which are not physical devices, but which may be, for example, an application running on a physical device, the device ID 200 may be generated on the fly or assigned by the physical device or assigned by an external process via a number of mechanisms. The prefix 202 is typically assigned by the device manufacturer or other authority and can be used for address grouping.

Note that in "Long Form" addresses, the "parent" element of the address is not necessarily the physically connected, topological parent of the node on the physical network. The parent in the "Long Form" address reflects as virtual topology, which is independent of the physical network connections.

Both the prefix 202 and the device ID 200 are multi-character strings consisting of hexadecimal characters and are not case-sensitive.

Both elements of a simple ACS Address (prefix, and ID) are of variable length. In the packet specification, each of these elements is preceded by a "byte length" integer. This is a departure from the fixed field lengths of IPv4 and IPv6 addresses. This makes the address space (number of available addresses) many orders of magnitude larger than IPv4 and IPv6. It also makes it possible to create fully-formed ACS addresses as small as 8 bytes long (4 byte-lengths of "1", 4 single-byte elements) for applications of the protocol within closed systems where a much smaller address space is advantageous. While the current implementation of the ACS address packet specification limits each byte length parameter to 8 bits, alternative implementations could increase this providing an effectively infinite number of possible unique addresses.

The addressing system provided by ACS, such as the requirement for ACS nodes to have globally unique and persistent addresses, provides a built-in mechanism that supports the establishment of trust among ACS nodes.

An ACS "node" is our term to describe any entity on an ACS network. An ACS node may be, for example, a hardware device, a virtual node, for example, a virtual machine, an application running on a hardware device, a file system, an account, or any other conceivable entity that may be part of the network. Therefore, as used herein, the term "node" or "device" is meant to encompass all type of entities that may be attached to a network.

It is required that each ACS node be given a unique name, or address. This address should be built-in to the node at time of manufacture/creation (like a MAC address) and should never change over the life cycle of the node Each ACS address is comprised of two parts: a prefix and an ID. FIG. 2*a* shows that a fully-formed ACS address for a given node is comprised of the address of that node's parent's prefix 210 followed by that node's parent's ID 208, followed by the node's own prefix 206 and the node's own ID 204.

The addressing features provided by ACS, such as use of address prefixes, provide a built-in mechanism to group addresses into virtual networks. Address prefixes in the ACS do not tie addresses for associated nodes to a particular network structure. Instead, addresses are tied to network nodes. The permanent association to of an address to a node, and, in particular, to a hardware-based device, is a feature of the addressing component of ACS. The address space is easily expandable and seamlessly backwards compatible to accommodate future namespace sizing needs without requiring rework of existing hardware, software or processes.

Address Prefixes—ACS Address prefixes can provide information about how the ACS address can be used on the network. For example, we define that a prefix starting with "D" means that the address following the prefix may be interpreted as a UTF-8 encoding of an internet domain. Address prefixes do not tie addresses to the network structure. Instead addresses are tied to devices (permanently, if possible). FIG. 2 provides an overview of the ACS address format and will be discussed in more detail below. Addresses can be tied to hardware, firmware or software, i.e. processes or to logical flow.

Mapping to IPv4, IPv6 and Internet Domains—ACS addresses provide built-in mechanisms for compatibility with existing IPv4, IPv6 addresses as well as with the modern internet domain convention of human readable "addresses" (such as "www.google.com", for example). Any of these forms of addressing may simply be converted into a UTF-8 representation of that address and stored as the ID in an ACS address. This provides a direct mapping from pre-existing address in the older protocols and the globally unique addresses in the ACS address space. See FIG. 2*b* ("Anatomy of a uNET Domain Address").

Note that ACS reserves the use of special prefixes for these types of mapped addresses, to provide clear indications about the availability of such mappings. The "D" prefix is used to designate IDs which are UTF-8 conversions of http addresses. The "4" prefix is used to designate IDs which are UTF-8 conversions of IPv4 addresses. The "6" prefix is used to designate IDs which are UTF-8 conversions of IPv6 addresses.

Addresses in ACS can be either anonymous or public, and public addresses can also have a named alias. Anonymous addresses are assigned by the node itself, with the rare (or intentional) exception of an address conflict within the parent (only the parent matters because anonymous addresses have strict visibility rules). If a conflict happens, the selected parent will announce a new non-conflicting address in a message. The node may continue to use the conflicting address for nodes "downstream" but must use the new non-conflicting address for "upstream" nodes. Sibling nodes may also suggest a non-conflicting address for use when connecting to that sibling. Purely non-verified/anonymous networks are also permitted, as are anonymous nodes in an otherwise validated network. In such cases, anonymous nodes may not be allowed to send traffic, but will be allowed to receive traffic.

Public addresses or Names are assigned by a root or an account provider (i.e, a third-party address provider) authorized by a root. Names come with a verifiable "Trust Certificate" that ties the assigned name to the node, to the account or to both.

Once a name is assigned, the assignment will preferably be permanent. Customers may "claim" a name to an account address. The account provider stores the relationship between the name(s) and the account that "claimed" them.

Packet Structure

ACS includes specification for special data packet formats, designed to coexist alongside existing TCP/IP networks. uNET Packets may piggy back inside these older packets, or they may supersede them, using Ethernet "jumbo frame" types.

Figure 6:
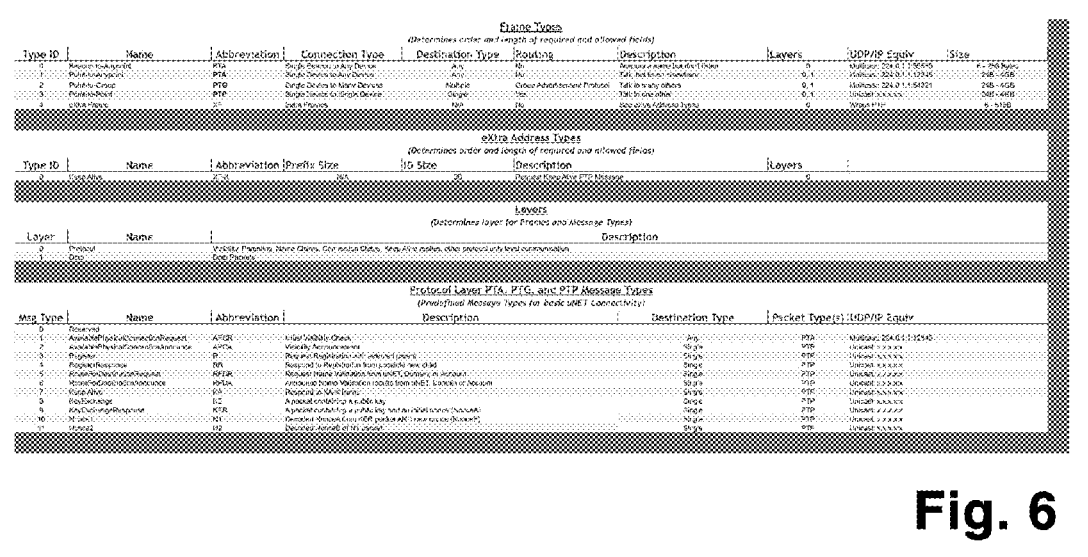

FIG. 6 outlines the specified uNET Frame Types and Message types.

Figure 7A:
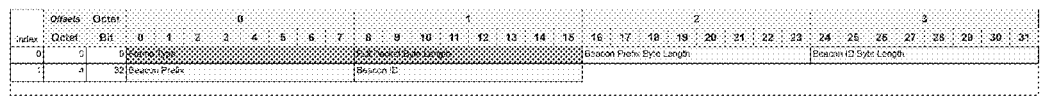
Figure 7B:
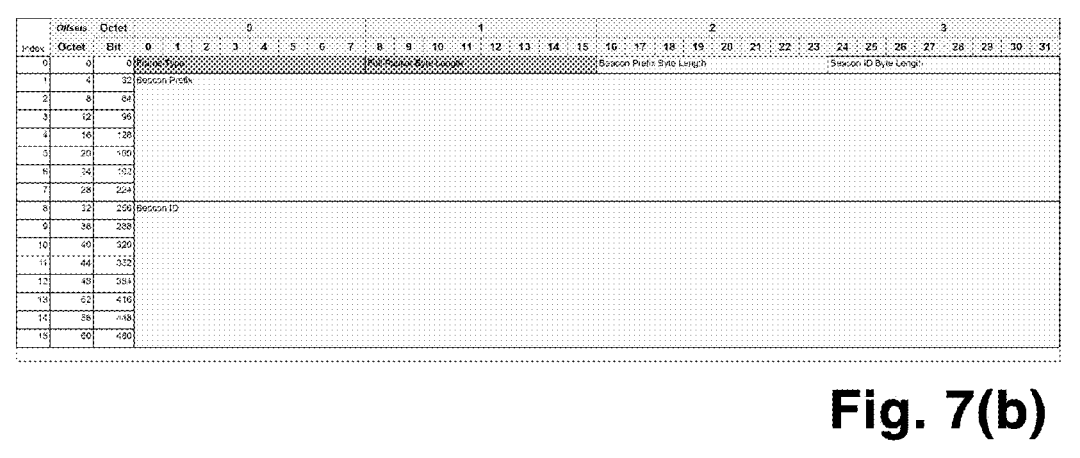
Figure 7C:
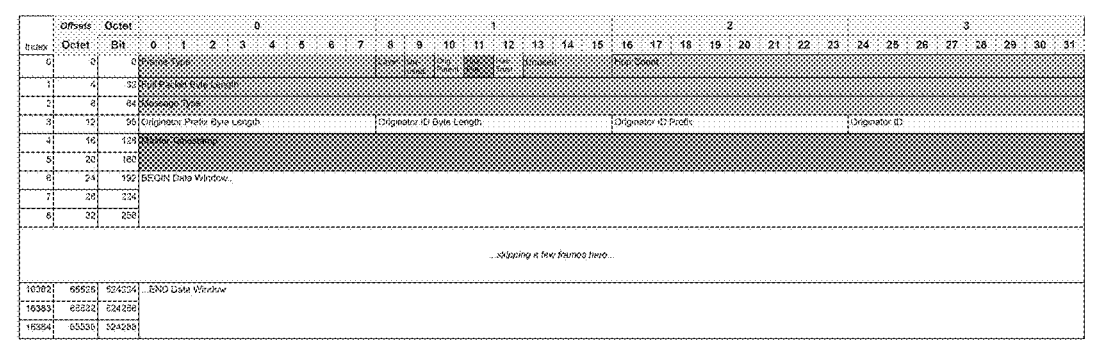
Figure 7D:
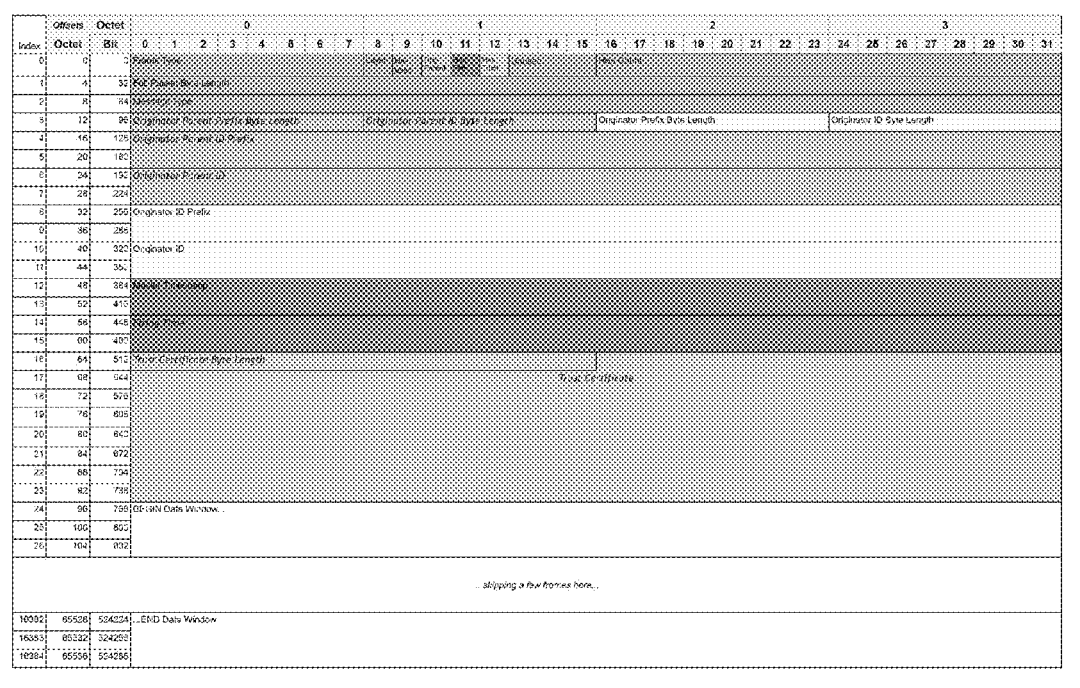
Figure 7E:
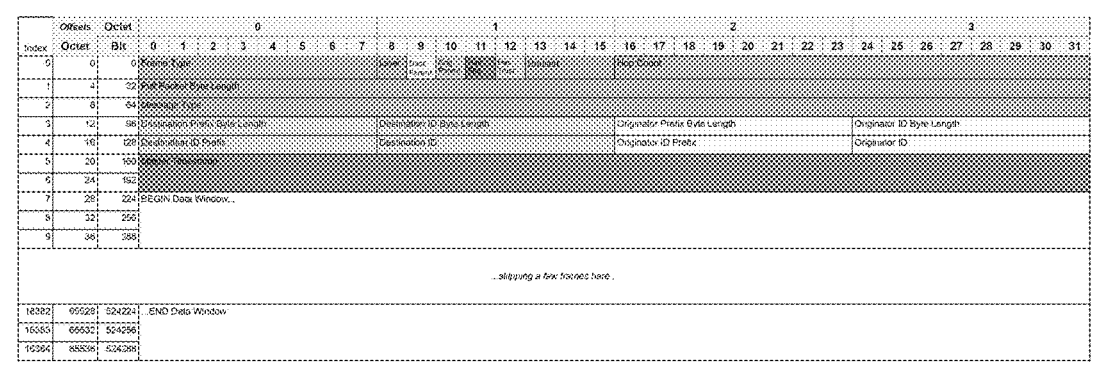
Figure 7F:
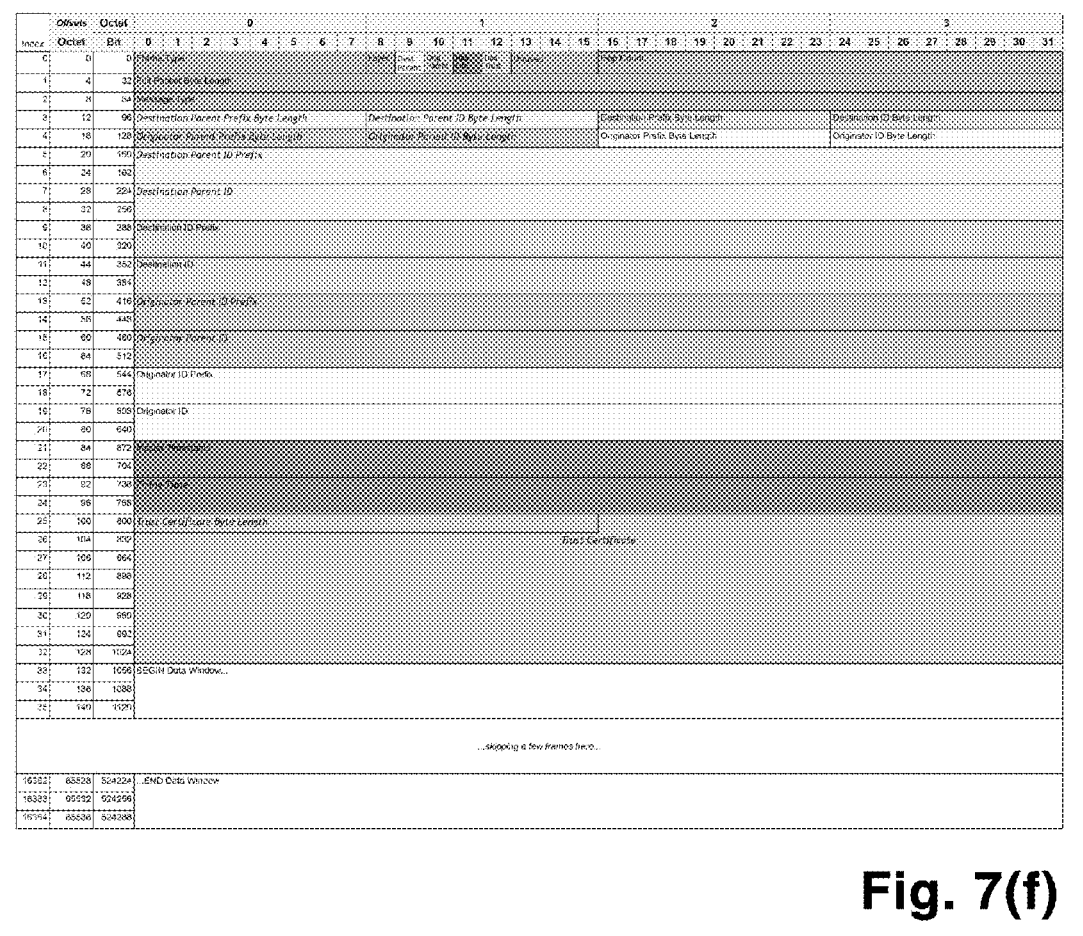
Figure 7G:
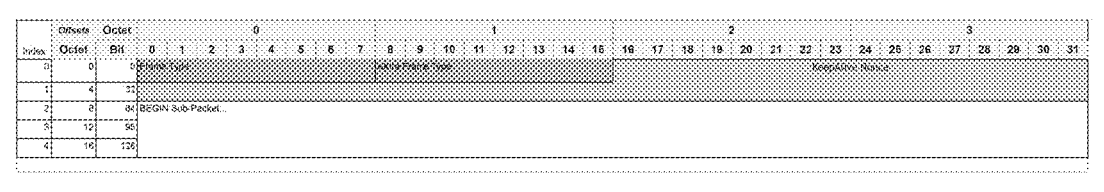
Figure 7H:
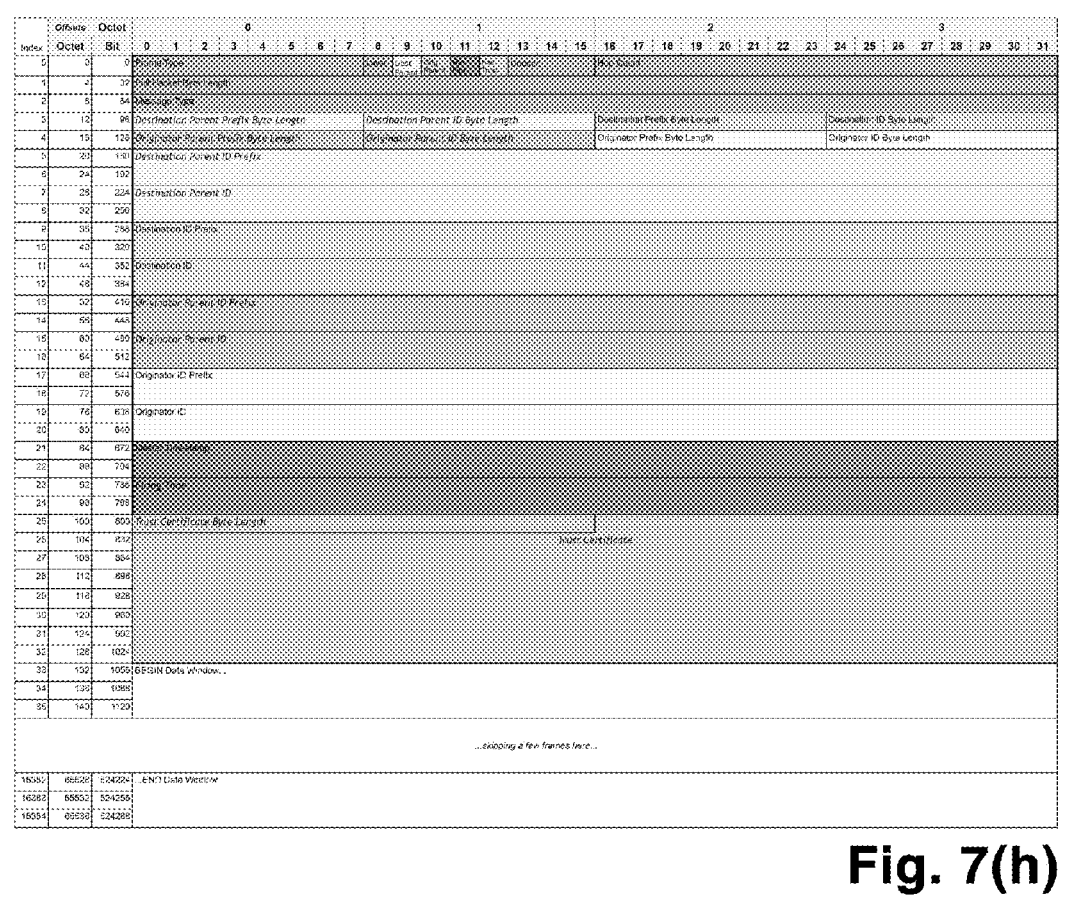
Figure 7I:
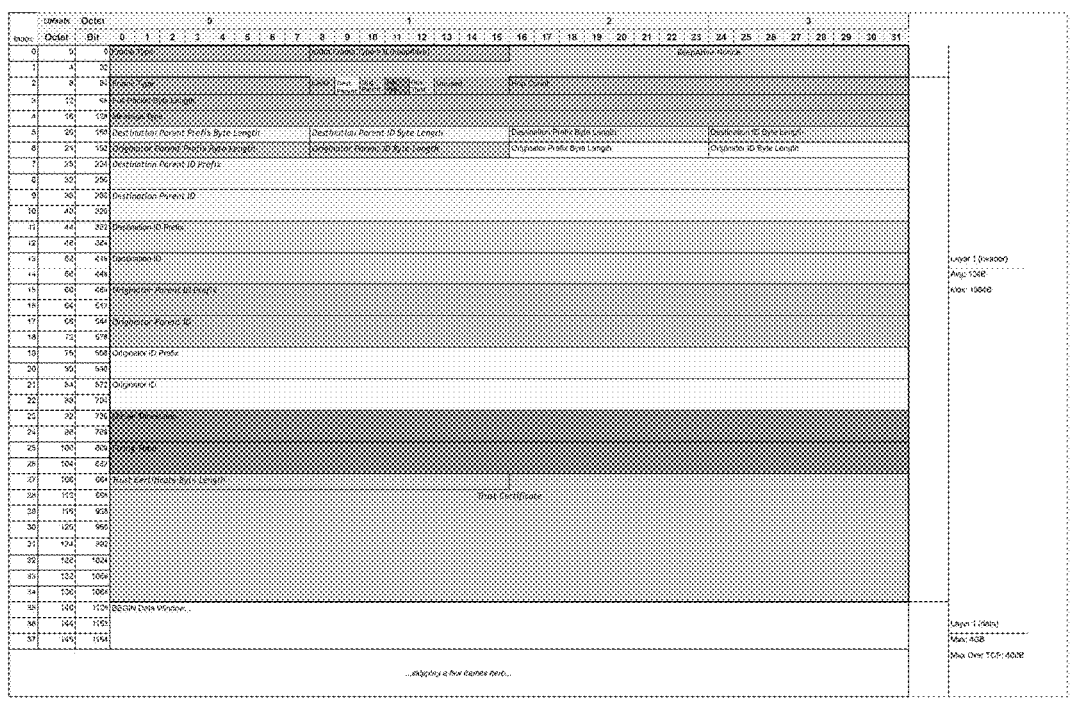

FIGS. 7(*a*)-7(*i*) illustrate the different uNET packet types and their structure.

States of Connection

ACS maintains the status of the connection between any two nodes using the ACS States of Connection system. This system is designed to excessive "handshaking" among physically connected nodes, especially in (but not limited to) wireless environments. FIG. 8 illustrates the 3 possible states for any ACS connection between two ACS nodes.

Any ACS node keeps track of the "Connection State" of all its physically connected ACS nodes. Each time a packet is received from another physically connected node, that "Connection State" of that node is set to "Connected". After a timeout interval (which is tunable by network administration or other factors) the "Connection State" of that node is set to "Connected Past Timeout". This doesn't represent a disconnection, but rather that the reliability of the connection is less certain. No immediate action is taken when a node enters this state. Any outbound traffic to a "Connected Past Timeout" node is wrapped in an ACS "Extra Frame" of type "KeepAlive". The receiving node, upon receiving this "Extra Frame" sends back an ACK ("Acknowledgement") message to the sender. The sender is then able to reset the "Connection State" of the node to "Connected".

If a connected node fails to ACK (respond) to a number of these "KeepAlive" frames, the "Connection State" of the node is set to "Disconnected". The number of "KeepAlive" failures required to produce this change in state is tunable based on network requirements.

Security

In preferred embodiments, security is implemented at the very base level of the protocol. See "Trust" section as discussed above. This means that each node is validated prior to connecting to the network and prior to sending any traffic beyond its immediate neighbors. The security algorithms are proven and have been validated by the industry and academia for many years. These security used in the preferred embodiment is also in use in browsers, VPN and highly secure commercial applications. Further, as new models arise, they can be easily incorporated to accommodate advances in security technology or to apply common fixes to discovered vulnerabilities.

By defining universal target addresses for known locations within the network, an outer destination frame can be placed around the main payload which can then be encrypted (using security trust) so that all nodes touching the packet in transit cannot decrypt or otherwise interrogate the payload. To the outside, all that is visible is that a packet is destined for a particular address. All information about the sending node, packet contents, etc. are invisible.

Security on physical nodes is implemented in a manner similar to the node-level security. Node-level security can protect processes from being compromised. This feature operates by accessing the same encryption engine as network security but instead applies it to the creation of running processes and memory access within a single server (or virtual machine). The two types of access protection can be utilized independently or together—one is not dependent on the other. All established and future process and memory access protection algorithms and services are supported and their inherent security is enhanced due to the use of the base security mechanisms, and in particular the trust packets provided by the network.

The invention has been presented by way of example. It should be noted by one of skill in the art that the invention is not to be limited to the examples presented, or to any particular implementation of the methods required for anode to participate in the network.

What is claimed is:

1. A computing node device comprising:
   a communication interface to communicate with other devices in a communications network; and
   a networking interface to:
      identify a plurality of computing nodes in the communications network, respective computing nodes of the plurality of computing nodes capable of being assigned a parent node of the computing node device;
      verify an identity of a particular computing node of the plurality of computing nodes, the particular node capable of requesting to join the communications network;
      transmit an identity of the computing node device to the particular computing node to enable the particular computing node to verify the identity of the computing node device;
      when the identify of the particular computing node has been verified, transmit, using the communications interface, a message, to the particular computing node;
      receive a response from the particular computing node, the response including metadata identifying a current load of the particular computing node;
      based on the metadata identifying the current load of the particular computing node, identify the particular computing node as the parent node of the computing node device;
      transmit, to the parent node, a request to register as part of the communications network.

2. The computing node of claim 1, wherein the network interface further comprises a database identifying the parent node, a list of child nodes, a list of sibling nodes, and a routing table to descendant nodes.

3. The computing node of claim 2, wherein the network interface is further configured to add the respective computing nodes of the plurality of computing nodes that were not selected as the parent to the list of siblings in the database.

4. The computing node of claim 2, wherein the network interface is further configured to:
   receive a data packet for routing at the communication interface, the packet identifying a destination node;
   query the list of siblings in the database to determine if the destination node is a sibling of the node; and
   rout the data packet to the sibling node when the destination node is a sibling node.

5. The computing node of claim 4, wherein the network interface is further configured to:
   when the destination node is not a sibling node, query the list of child nodes in the database to determine if the destination node is a child of the node; and
   route the data packet to the child node when the destination node is a child node.

6. The computing node of claim 5, wherein the network interface is further configured to:
   when the destination node is not a child node, route the data packet to the parent node.

7. A method comprising:
   identifying, using a computing device, a plurality of nodes in a communications network, respective computing nodes of the plurality of computing nodes capable of being assigned a parent node;
   verifying an identity of a particular computing node of the plurality of computing nodes, the particular node capable of requesting to join the communications network;
   transmitting an identity of the computing node device to the particular computing device to enable the particular computing node to verify the identity of the computing node device;
   when the identify of the particular computing node has been verified, transmitting, using the computing device, a message, to the particular computing node;
   receiving, at the computing device, a response from the particular computing node, the response including metadata identifying a current load of the particular computing node;

based on the metadata identifying the current load of the particular computing node, identifying the particular computing node as the parent node; and transmitting to the parent node, using the computing device, a request to register as part of the communications network.

8. The method of claim 7, further comprising storing an indication of the parent node in a database including a list of child nodes, a list of sibling nodes, and a routing table to descendant nodes.

9. The method of claim 8, further comprising adding the respective computing nodes of the plurality of computing nodes that were not selected as the parent to the list of siblings in the database.

10. The method of claim 8, further comprising:
receive a data packet for routing at the communication interface, the packet identifying a destination node;
query the list of siblings in the database to determine if the destination node is a sibling of the node; and
rout the data packet to the sibling node when the destination node is a sibling node.

11. The method of claim 10, further comprising:
when the destination node is not a sibling node, query the list of child nodes in the database to determine if the destination node is a child of the node; and
route the data packet to the child node when the destination node is a child node.

12. The method of claim 11, further comprising when the destination node is not a child node, route the data packet to the parent node.

13. A non-transitory computer readable medium encoded with instructions executable by one or more computing devices, the instructions comprising:
identifying a plurality of nodes in a communications network, respective computing nodes of the plurality of computing nodes capable of being assigned a parent node;
verifying an identity of a particular computing node of the plurality of computing nodes, the particular node capable of requesting to join the communications network;
transmitting an identity of the computing node device to the particular computing device to enable the particular computing node to verify the identity of the computing node device;
when the identify of the particular computing node has been verified, transmitting a message, to the particular computing node;

receiving a response from the particular computing node, the response including metadata identifying a current load of the particular computing node;
based on the metadata identifying the current load of the particular computing node, identifying the particular computing node as the parent node; and
transmitting to the parent node, a request to register as part of the communications network.

14. The non-transitory computer readable medium of claim 13, wherein the network interface further comprises a database identifying the parent node, a list of child nodes, a list of sibling nodes, and a routing table to descendant nodes.

15. The non-transitory computer readable medium of claim 14, wherein the network interface is further configured to add the respective nodes of the plurality of nodes that were not selected as the parent to the list of siblings in the database.

16. The non-transitory computer readable medium of claim 14, wherein the network interface is further configured to:
receive a data packet for routing at the communication interface, the packet identifying a destination node;
query the list of siblings in the database to determine if the destination node is a sibling of the node; and
route the data packet to the sibling node when the destination node is a sibling node.

17. The non-transitory computer readable medium of claim 16, wherein the network interface is further configured to:
when the destination node is not a sibling node, query the list of child nodes in the database to determine if the destination node is a child of the node; and
route the data packet to the child node when the destination node is a child node.

18. The non-transitory computer readable medium of claim 17, wherein the network interface is further configured to: when the destination node is not a child node, route the data packet to the parent node.

19. The computing node of claim 1, further comprising:
verifying an identify of a computing node of the plurality of computing nodes that is different than the particular computing node; and
verifying, by the computing node of the plurality of computing nodes that is different than the particular computing node, the identity of the computing node device.

* * * * *